3,810,959
N-(ALKOXYALYL)-o-ALKYL-S-ALKYLTHIO-
PHOSPHORS-AMIDES
Edmund Jeremiah Gaughan, Berkeley, Calif., assignor to
Stauffer Chemical Company, New York, N.Y.
No Drawing. Filed Feb. 12, 1973, Ser. No. 331,453
Int. Cl. A01n 9/36; C07f 9/24
U.S. Cl. 260—941                4 Claims

ABSTRACT OF THE DISCLOSURE

The compounds of this invention are those having the formula

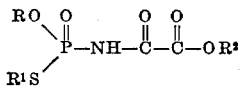

in which R, R¹ and R² are lower alkyl and their use as insecticides.

---

This invention relates to certain novel phosphorus containing chemical compounds and their use as insecticides.

The compounds of this invention are those having the formula

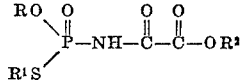

in which R, R¹ and R² are independently alkyl having 1 to 4 carbon atoms, preferably 1 to 2 carbon atoms.

The compounds of the present invention can be prepared according to the following reaction:

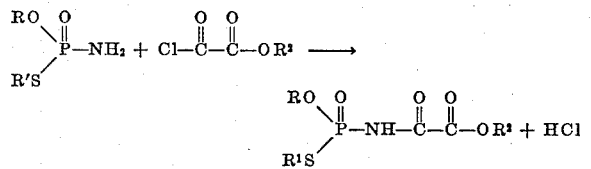

The reaction can be carried out at about 0 to 60° C. in the presence of solvents such as methylene chloride, chloroform, tetrahydrofuran and benzene. Pressure is not critical in this reaction. For convenience, atmospheric or autogenous pressure will be used. Under normal conditions, stoichiometric proportions or a slight deficiency of acylating agent will be used. The reaction will usually take 2 to 24 hours to reach completion. The reaction product may be purified by conventional extraction and recrystallization techniques.

Preparation of the compounds of this invention is illustrated in the following examples:

EXAMPLE I

N-(ethyloxalyl-)-O-ethyl-S-methylthiophosphoramide

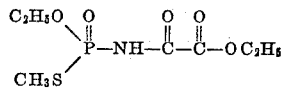

4.7 grams (0.03 mole) of O-ethyl-S-methylthiophosphoramide and 4.4 grams (0.032 mole) of ethyl oxalyl chloride and 30 milliliters of CH₂Cl₂ are refluxed in a 100-ml. 3 neck flask fitted with a stirrer, thermometer and condenser for 7 hours. The mixture is then stirred overnight at room temperature. The mixture was filtered through celite and then the CH₂Cl₂ was removed in vacuo.

EXAMPLE II

N-(ethyloxalyl-)-O,S-dimethylthiophosphoramide

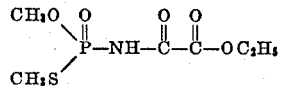

30.7 grams of O,S-dimethylthiophosphoramide and 31.5 grams of ethyl oxalyl chloride and 210 milliliters of CH₂Cl₂ are heated at 35°–40° C. in a 3 neck flask fitted with a stirrer, thermometer and condenser for 5 hours. The mixture is then stirred overnight at room temperature. The mixture is refluxed for 2 hours. The solvent is removed in vacuo. The residue is taken up in CH₂Cl₂, washed with concentrated Na₂CO₃ solution and the organic phase dried.

The organic phase is dried and again evaporated in vacuo. The residue crystallizes upon stirring. It is triturated with hexane and placed in a vacuated desiccator, yielding 23.3 g. of the desired product. A sample of the product is submitted for g.l.c. A 95% purity is found, M.P. 60–66°. The structure is confirmed by NMR and IR.

The following is a table of certain selected compounds that are preparable according to the procedure described hereto. Compound numbers are assigned to each compound and are used throughout the remainder of the application.

TABLE I $$\begin{array}{c} RO \\ \diagdown \\ R^1S \end{array} \begin{array}{c} O \\ \| \\ P \end{array} -NH- \begin{array}{c} O \\ \| \\ C \end{array} - \begin{array}{c} O \\ \| \\ C \end{array} -OR^2$$

| Compound number | R | R¹ | R² |
|---|---|---|---|
| 1 | C₂H₅ | CH₃ | C₂H₅ |
| 2 | CH₃ | CH₃ | C₂H₅ |
| 3 | n-C₄H₉ | CH₃ | CH₃ |
| 4 | n-C₄H₉ | CH₃ | n-C₄H₉ |
| 5 | CH₃ | n-C₄H₉ | C₂H₅ |
| 6 | CH₃ | n-C₄H₉ | n-C₄H₉ |
| 7 | CH₃ | CH₃ | n-C₄H₉ |
| 8 | n-C₄H₉ | n-C₄H₉ | n-C₄H₉ |

INSECTICIDAL EVALUATION TESTS

The following insect species were used in evaluation tests for insecticidal activity:

(1) Housefly (HF)—*Musca domestica* (Linn.)
(2) German roach (GR)—*Blatella germanica* (Linn.)
(3) Lygus bug (LB)—*Lygus hesperus* (Knight)
(4) Bean aphid (BA)—*Aphis fabae* (Scop.)

The housefly (HF) was used in evaluation tests of selected compounds as insecticides by the following procedure. A stock solution containing 100 μg./ml. of the toxicant in an appropriate solvent was prepared. Aliquots of this solution were combined with one milliliter of an acetone-peanut oil solution in an aluminum dish and allowed to dry. The aliquots were those necessary to achieve desired toxicant concentration ranging from 100 μg. per dish to that at which 50 percent mortality was attained. The dishes were placed in a circular cardboard cage, closed on the bottom with cellophane and covered on top with cloth netting. Twenty-five female houseflies, three to five days old, were introduced into the cage and the percent mortality was recorded after 48 hours. The LD₅₀ values are expressed in terms of μg. per 25 female flies. The results of these insecticidal evaluation tests are given in Table II under "HF."

In the German cockroach (GR) tests, 10 one-month old nymphs were placed in separate circular cardboard cages sealed on one end with cellophane and covered by a cloth netting on the other. Aliquots of the toxicants, dissolved in an appropriate solvent, were diluted in water containing 0.002% of a wetting agent, Sponto 221®—(a polyoxyether of alkylated phenols blended with organic sulfonates). Test concentrations ranged from 0.1% downward to that at which 50 percent mortality was obtained. Each of the aqueous suspensions of the candidate compounds was sprayed onto the insects through the cloth netting by means of a hand-spray gun. Percent mortality in each case was recorded after 72 hours, and the $LD_{50}$ values, expressed as percent of toxicant in the aqueous spray, were recorded. These values are reported under the column "GR" in Table II.

The Lygus bug (LB), *Lygus hesperus*, was tested similarly as the German cockroach. The caged insects were sprayed with the candidate compounds at concentrations ranging from 0.05% downward to that at which 50 percent mortality was obtained. After twenty-four and seventy-two hours, counts were made to determine living and dead insects. The $LD_{50}$ (percent) values were calculated. These values are reported under the column "LB" in Table II.

The insect species Black Bean Aphid (BA), *Aphis fabae*, (Scop.)—was also employed in the test for insecticidal activity. Young nasturtium (Tropaeolum sp.) plants, approximately 2 to 3 inches tall, were used as the host plants for the Bean Aphid. The host plant was infested with approximately 50–75 of the aphids. The test chemical was dissolved in acetone, added to water which contained a small amount of Sponto 221®, an emulsifying agent. The solution was applied as a spray to the infested plants. Concentrations ranged from 0.05 percent downward until an $LD_{50}$ value was achieved. These results are given in Table II under the Column "BA."

Young nasturtium plants were used as the host plants for the Bean Aphid. The host plants were transplanted into one pound of soil that had been treated with the candidate compound. Immediately after planting in the treated soil the plants were infested with aphids. Concentrations of toxicant in the soil ranged from 10 p.p.m. per pound of soil downward until an $LD_{50}$ value was obtained. Mortality was recorded after 72 hours.

The percentage of kill of the test species was determined by comparison with control plants placed in distilled water or untreated soil. The $LD_{50}$ values were calculated. These systemic test results are reported in Table II under the column "Ba-Sys."

TABLE II.—$LD_{50}$ VALUES

| Compound number | Percent | | | | BA-SYS, p.p.m. |
|---|---|---|---|---|---|
| | HF | GR | LB | BA | |
| 1 | 40 | .01 | | .008 | .5 |
| 2 | 4 | .005 | .05 | .03 | .8 |

As those in the art are well aware, various techniques are available for incorporating the active component or toxicant in suitable pesticidal compositions. Thus, the pesticidal compositions can be conveniently prepared in the form of liquid or solids, the latter preferably as homogeneous free-flowing dusts commonly formulated by admixing the active component with finely divided solids or carriers as exemplified by talc, natural clays, diatomaceous earth, various flours, such as walnut shell, sheat, soya bean, cottonseed and so forth.

Liquid compositions are also useful and normally comprise a dispersion of the toxicant in a liquid media, although it may be convenient to dissolve the toxicant directly in a solvent such as kerosene, fuel oil, xylene, alkylated naphthalenes or the like and use such organic solutions directly. However, the more common procedure is to employ dispersions of the toxicant in an aqueous media and such compositions may be produced by forming a concentrated solution of the toxicant in a suitable organic solvent followed by dispersion in water, usually with the aid of surface active agents. The latter, which may be the anionic, cationic, or nonionic types, are exemplified by sodium stearate, potassium oleate and other alkaline metal soaps and detergents such as sodium lauryl sulfate, sodium naphthalene sulfonate, sodium alkyl naphthalene, sulfonate, methyl cellulose, fatty alcohol ethers, polyglycol fatty acid esters and other polyoxyethylene surface active agents. The proportion of these agents commonly comprises 1–15% by weight of the pesticidal compositions although the proportion is not critical and may be varied to suit any particular situation.

It is claimed:

1. Compounds having the formula

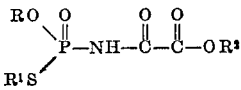

in which R, $R^1$ and $R^2$ are independently alkyl having 1 to 4 carbon atoms.

2. The compounds of claim 1 wherein R, $R^1$ and $R^2$ are independently alkyl having 1 to 2 carbon atoms.

3. The compound of claim 1 wherein R is ethyl, $R^1$ is methyl and $R^2$ is ethyl.

4. The compound of claim 1 wherein R is methyl, $R^1$ is methyl and $R^2$ is ethyl.

References Cited
UNITED STATES PATENTS
3,399,213   8/1968   Osborne _____ 260—959 X ANTON H. SUTTO, Primary Examiner U.S. Cl. X.R.
260—942, 959; 424—212